(12) United States Patent
Moon et al.

(10) Patent No.: US 11,493,960 B2
(45) Date of Patent: Nov. 8, 2022

(54) ELECTRONIC DEVICE COVERS

(71) Applicant: Hewlett-Packard Development Company, L.P., Spring, TX (US)

(72) Inventors: Philip Moon, Spring, TX (US); Ilchan Lee, Spring, TX (US); Stacy L. Wolff, Spring, TX (US)

(73) Assignee: Hewlett-Packard Development Company, L. P., Spring, TX (US)

( * ) Notice: Subject to any disclaimer, the term of this patent is extended or adjusted under 35 U.S.C. 154(b) by 80 days.

(21) Appl. No.: 16/959,110

(22) PCT Filed: Jan. 5, 2018

(86) PCT No.: PCT/US2018/012526
§ 371 (c)(1),
(2) Date: Jun. 29, 2020

(87) PCT Pub. No.: WO2019/135759
PCT Pub. Date: Jul. 11, 2019

(65) Prior Publication Data
US 2020/0333841 A1    Oct. 22, 2020

(51) Int. Cl.
*G06F 1/16* (2006.01)
*G06F 3/02* (2006.01)

(52) U.S. Cl.
CPC .......... *G06F 1/1632* (2013.01); *G06F 1/1615* (2013.01); *G06F 1/1656* (2013.01); *G06F 3/0208* (2013.01); *G06F 1/1681* (2013.01)

(58) Field of Classification Search
CPC .... G06F 1/1632; G06F 1/1615; G06F 1/1656; G06F 3/0208; G06F 1/1681; G06F 1/1626; G06F 2200/1633
See application file for complete search history.

(56) References Cited

U.S. PATENT DOCUMENTS

| 6,882,524 B2 | 4/2005 | Ulla et al. |
| 7,735,644 B2 * | 6/2010 | Sirichai .................... A45F 5/02 |
| | | 206/45.24 |

(Continued)

FOREIGN PATENT DOCUMENTS

| CN | 103576745 | 2/2014 |
| CN | 103576745 A | 2/2014 |

(Continued)

OTHER PUBLICATIONS https://www.logitech.com/en-us/product/create-ipad-pro-keyboard#specification-tabular.

(Continued)

*Primary Examiner* — Anthony M Haughton
*Assistant Examiner* — Theron S Milliser
(74) *Attorney, Agent, or Firm* — Rahman LLC

(57) ABSTRACT

An example electronic device cover includes a body component to attach to an electronic device. The body component articulates among a first, second, and third configuration. The body component includes a first section to attach to the electronic device. A second section attaches to the first section, bends with respect to the first section, and provides structural support to the electronic device in the second configuration. A third section attaches to the second section, and bends with respect to the second section. A fourth section attaches to the third section and includes a rotatable data port. An input device attaches to the fourth section and is operatively connected to the data port. The input device is to be held against and face the electronic device in the third configuration. The body component constrains the electronic device within a perimeter boundary of the fourth section in the first and third configurations.

20 Claims, 9 Drawing Sheets

(56) References Cited

U.S. PATENT DOCUMENTS

| | | | | |
|---|---|---|---|---|
| 8,143,982 B1 * | 3/2012 | Lauder | ............... | G06F 1/1626 |
| | | | | 361/679.01 |
| 9,149,100 B2 * | 10/2015 | Marshall | ............... | G06F 1/1667 |
| 9,678,542 B2 * | 6/2017 | Whitt, III | ............... | G06F 1/1681 |
| 9,706,089 B2 * | 7/2017 | Beck | ............... | G06F 1/1686 |
| 9,715,254 B2 | 7/2017 | Mori | | |
| 10,386,893 B2 * | 8/2019 | Kim | ............... | G06F 1/1669 |
| 11,073,871 B2 * | 7/2021 | Jung | ............... | G06F 1/1616 |
| 2008/0302687 A1 * | 12/2008 | Sirichai | ............... | A45C 11/00 |
| | | | | 206/320 |
| 2012/0037285 A1 | 2/2012 | Diebel et al. | | |
| 2012/0181195 A1 * | 7/2012 | Lu | ............... | A45C 13/34 |
| | | | | 206/320 |
| 2014/0028865 A1 | 1/2014 | Ohtaka | | |
| 2014/0069710 A1 | 3/2014 | Webb | | |
| 2014/0083883 A1 | 3/2014 | Elias | | |
| 2015/0212588 A1 * | 7/2015 | Fujioka | ............... | G06F 3/0219 |
| | | | | 345/168 |
| 2016/0049981 A1 | 2/2016 | Jen et al. | | |
| 2016/0062415 A1 | 3/2016 | Cudak | | |
| 2017/0068281 A1 | 3/2017 | Smith | | |
| 2017/0192455 A1 * | 7/2017 | Kim | ............... | G06F 1/1628 |
| 2017/0351299 A1 | 12/2017 | Li et al. | | |
| 2020/0301480 A1 * | 9/2020 | Miller | ............... | G06F 1/1681 |
| 2020/0348731 A1 * | 11/2020 | Jung | ............... | G06F 1/1616 |

FOREIGN PATENT DOCUMENTS

| | | |
|---|---|---|
| CN | 204314791 | 5/2015 |
| CN | 206162404 | 5/2017 |
| JP | 2015087908 A | 5/2015 |
| JP | 2015087908 A | 5/2015 |
| WO | 2015130293 A1 | 9/2015 |
| WO | WO2015130293 A1 | 9/2015 |
| WO | 2017040093 A1 | 3/2017 |
| WO | WO2017040093 A1 | 3/2017 |

OTHER PUBLICATIONS

Samsung Galaxy TabPro S, https://www.samsung.com/global/galaxy/galaxy-tab-pro-s/, 18 pages, retrieved Apr. 19, 2022.

* cited by examiner

ELECTRONIC DEVICE COVERS

BACKGROUND

Examples of electronic devices include computers. Some types of computers include tablet computers and laptop computers. Some computers may be used in both a tablet computer configuration and a laptop computer configuration.

DETAILED DESCRIPTION

Figure 1:
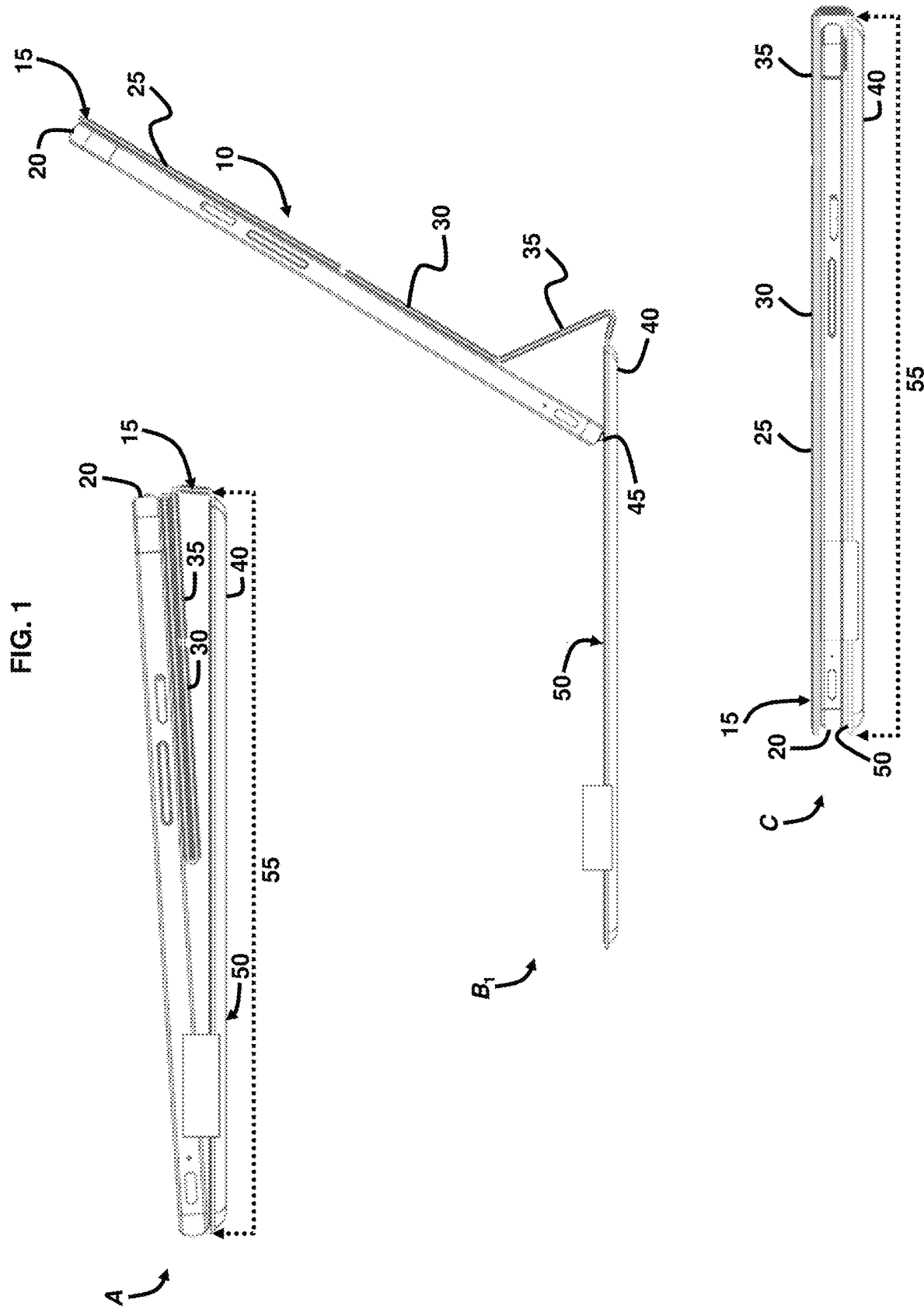
FIG. 1 is a schematic diagram illustrating side views of an electronic device cover articulating between a first configuration, a second configuration, and a third configuration, according to an example.

Tablet computers may be used in various settings, such as in a tablet-mode setting where a user may hold the tablet computer and directly interface with the tablet screen, or in a laptop-mode setting where a user may use a stand to hold the tablet computer and use an input device, such as a keyboard, to interface with the tablet screen. Covers or cases may be used to protect the tablet computer, particularly when the computer is not in use or is being transported. A cover may also function as a stand for the tablet computer so that the tablet computer may be upheld for a user to comfortably view the tablet screen. Depending on the style of the cover and the corresponding style of the tablet computer, the cover may not be able to completely protect the tablet computer, which may also limit the ability to move the tablet screen in a manner desired by a user. The examples described herein provide a cover for a tablet computer. The cover contains a connected keyboard, and the cover is bendable. The cover may be positioned as a stand to allow the tablet computer to function in a laptop configuration as well as a tablet configuration. The cover also contains a rotating data port that connects to the tablet computer when used in the laptop configuration to allow the keyboard to connect to the tablet computer to permit full laptop functioning of the tablet computer. The data port is generally planar to the cover when it is not connected to the tablet computer; i.e., not in the laptop configuration, and the data port rotates out of the cover when engaged to connect to the tablet computer.

An example provides an electronic device cover comprising a first panel or section to attach to an electronic device, and a second panel or section operatively connected to the first panel. The second panel is to rotate with respect to the first panel. The electronic device cover also comprises a third panel or section rotatably connected to the second panel to allow the electronic device to articulate between a first configuration, a second configuration, and a third configuration. The second panel and the third panel are to provide structural stability to the electronic device in the second configuration. The electronic device cover also includes a fourth panel or section rotatably connected to the third panel and comprising a recessed portion. An elongated member is positioned in the recessed portion. The elongated member comprises a data port to connect to the electronic device. A keyboard is integrated with the fourth panel and is communicatively linked to the data port. In an example, the first configuration and the third configuration are set to completely confine a position of the electronic device within a boundary edge of the fourth panel. The elongated member is to rotate out of the recessed portion, according to an example. The keyboard is to directly face away from the electronic device in the first configuration, and the keyboard is to directly face the electronic device in the third configuration, according to various examples.

FIG. 1 is a schematic diagram illustrating side views of an electronic device cover 10 comprising a body component 15 to attach to an electronic device 20. The body component 15 may comprise any of a variety of materials including aluminum, carbon fiber, silicon, steel, neoprene, rubber, plastic, polyurethane, thermoplastic polyurethane, polycarbonate, bamboo, felt, leather, fabric, wood, suede, microfiber, and animal skin. The body component 15 may be formed of one or more layers of the base material and a covering to form the outer surface. The base material, not shown, of the body component 15 comprises a sufficient material stiffness and strength characteristics to properly support the electronic device 20 without buckling or otherwise failing to retain the electronic device 20 in a user-specified configuration. The body component 15 is to articulate among a first configuration A, a second configuration $B_1$, and a third configuration C. While three configurations A, $B_1$, and C are depicted in FIG. 1, the body component 15 may be positioned in various other configurations in accordance with a user's articulation of the body component 15 and desired viewing angle of the electronic device 20. According to examples, the electronic device 20 may be a tablet computer, a mini-tablet computer, a smartphone, or other similar device.

The body component 15 comprises a first section 25 to attach to the electronic device 20. The first section 25 may attach to the electronic device 20 using any suitable attachment mechanism or technique including, for example, magnetic, Velcro® connector, tape, adhesive, and slides/locks or other attachment mechanisms. The body component 12 also includes a second section 30 operatively connected to the first section 25. The attachment of the second section 30 to the first section 25 may be a direct attachment or there may be an intervening component to facilitate the attachment. According to some examples, the attachment may occur on the surface of the first and second sections 25, 30 or it may occur inside the covering over the first and second sections 25, 30.

The second section 30 is to bend with respect to the first section 25 at an area where the second section 30 attaches to the first section 25. In one example, the second section 30 bends in one angular direction with respect to the first section 25. In another example, the second section 30 bends in either angular direction with respect to the first section 25. When the electronic device 20 is attached to the body component 15, the second section 30 may be bent between 0° to 180° with respect to the first section 25, and with respect to the electronic device 20. For example, in the first configuration A, the first section 25 and the second section 30 are parallel to one another caused by a 180° bend of the second section 30 with respect to the first section 25, and the electronic device 20. Moreover, in the second configuration $B_1$ and the third configuration C, the first section 25 and the second section 30 are aligned in a planar manner due to a 0° bend of the second section 30 with respect to the first section 25, and the electronic device 20. When the electronic device 20 is not attached to the body component 15, the second section 30 may be bent between 0° to 360° with respect to the first section 25. In one example, the second section 30 does not attach to the electronic device 20, but may be held adjacent to the electronic device 20 depending on the particular configuration of the body component 15. According to another example, the second section 30 may also attach to the electronic device 20 using any suitable attachment mechanism or technique including, for example, magnetic, Velcro® connector, tape, adhesive, and slides/locks or other attachment mechanisms.

The body component 15 also comprises a third section 35 operatively connected to the second section 30. The attachment of the third section 35 to the second section 30 may be a direct attachment or there may be an intervening component to facilitate the attachment. According to some examples, the attachment may occur on the surface of the second and third sections 30, 35 or it may occur inside the covering over the second and third sections 30, 35.

The third section 35 is to bend with respect to the second section 30 at an area where the third section 35 attaches to the second section 30. In one example, the third section 35 bends in one angular direction with respect to the second section 30. In another example, the third section 35 bends in either angular direction with respect to the second section 30. When the electronic device 20 is attached to the body component 15, the third section 35 may be bent between 0° to 90° with respect to the second section 30, and the electronic device 20. For example, in the first configuration A and third configuration C, the second section 30 and the third section 35 are aligned in a planar manner due to a 0° bend of the third section 35 with respect to the second section 30, and the electronic device 20. Furthermore, in the second configuration $B_1$, the third section 35 is shown to be bent at an angle less than 90° with respect to the electronic device 20. When the electronic device 20 is not attached to the body component 15, the third section 35 may be bent between 0° to 360° with respect to the second section 30. In one example, the third section 35 does not attach to the electronic device 20, but may be held adjacent to the electronic device 20 depending on the particular configuration of the body component 15. According to another example, the third section 35 may also attach to the electronic device 20 using any suitable attachment mechanism or technique including, for example, magnetic, Velcro® connector, tape, adhesive, and slides/locks or other attachment mechanisms.

Any of the second section 30 and the third section 35 are to provide structural support to the electronic device 20 in the second configuration $B_1$. Accordingly, the second section 30 is to provide structural support to the electronic device 20 in the second configuration $B_1$ in one example. In another example, the third section 35 is to provide structural support to the electronic device 20 and may do so in conjunction with, or instead of, the second section 30. The structural support afforded by any of the second section 30 and the third section 35 provide a counter-force to the weight of the electronic device 20 to permit the electronic device 20 to stay at a substantially upright and/or angled configuration, which permits the electronic device 20 to be used and/or viewed by a user in a laptop configuration.

The body component 15 also comprises a fourth section 40 operatively connected to the third section 35. The attachment of the fourth section 40 to the third section 35 may be a direct attachment or there may be an intervening component to facilitate the attachment. According to some examples, the attachment may occur on the surface of the third and fourth sections 35, 40 or it may occur inside the covering over the third and fourth sections 35, 40. The fourth section 40 is to bend with respect to the third section 35 at an area where the fourth section 40 attaches to the third section 35. In one example, the fourth section 40 bends in one angular direction with respect to the third section 35. In another example, the fourth section 40 bends in either angular direction with respect to the third section 35. When the electronic device 20 is attached to the body component 15, the fourth section 40 may be bent between 0° to 360° with respect to the third section 35. For example, in the first configuration A and third configuration C, the third section 35 and the fourth section 40 are generally parallel to one another due to the bending of the fourth section 40 with respect to the third section 35. In the second configuration $B_1$, the fourth section 40 is shown to be bent at an angle less than 90° with respect to the third section 35. When the electronic device 20 is not attached to the body component 15, the fourth section 40 may be bent between 0° to 360° with respect to the third section 35.

The fourth section 40 comprises a rotatable data port 45. In an example, the data port 45 is to connect to the electronic device 20 in the second configuration $B_1$. The data port 45 may be any type of communication port that facilitates the connection between two components to permit electrical signals to be transmitted between the two components. The data port 45 is to rotate with respect to the fourth section 40. In an example, the data port 45 may rotate towards the electronic device 20. An input device 50 is operatively connected to the fourth section 40 and is operatively connected to the rotatable data port 45. The input device 50 may include any suitable mechanism to permit a user to interact with the electronic device 20 through the input device 50. The input device 50 may be integrated with the fourth section 40, in one example. According to another example, the input device 50 may be operatively connected to the fourth section 40 using any suitable attachment mechanism or technique including, for example, magnetic, Velcro® connector, tape, adhesive, and slides/locks or other attachment mechanisms. The input device 50 is to be held against and face the electronic device 20 in the third configuration C. The body component 15 is to constrain the electronic device 20 within a perimeter boundary 55 of the fourth section 40 in the first configuration A and the third configuration C. In this regard, when the body component 15 is bent such that the electronic device 20 is retained by the body component 15 to function in a tablet-mode configuration; e.g., the first configuration A, then the edges of the electronic device 20 are constrained within the boundary 55 defined by the outer edge; e.g., perimeter, of the fourth section 40. Similarly, when the body component 15 is bent such that the electronic device 20 is retained by the body component 15 in a stowed configuration; e.g., the third configuration C, then the edges of the electronic device 20 are constrained within the boundary 55 defined by the outer edge; e.g., perimeter, of the fourth section 40. Accordingly, in either the first configuration A or the third configuration C, the electronic device 20 does not overhand or otherwise extend beyond the perimeter boundary 55 of the fourth section 40 of the body component 15.

As shown in FIG. 1, the second section 30 and the third section 35 are to articulate between a flat configuration and a bent configuration. In this context, the flat configuration corresponds to any of the first configuration A and the third configuration C of the body component 15. The bent configuration corresponds to the second configuration $B_1$ of the body component 15. The first configuration A may correspond to a tablet-mode configuration of the electronic device 20. The second configuration $B_1$ may correspond to a laptop-mode configuration of the electronic device 20. The third configuration C may correspond to a stored/protected configuration of the electronic device 20.

Figure 2:
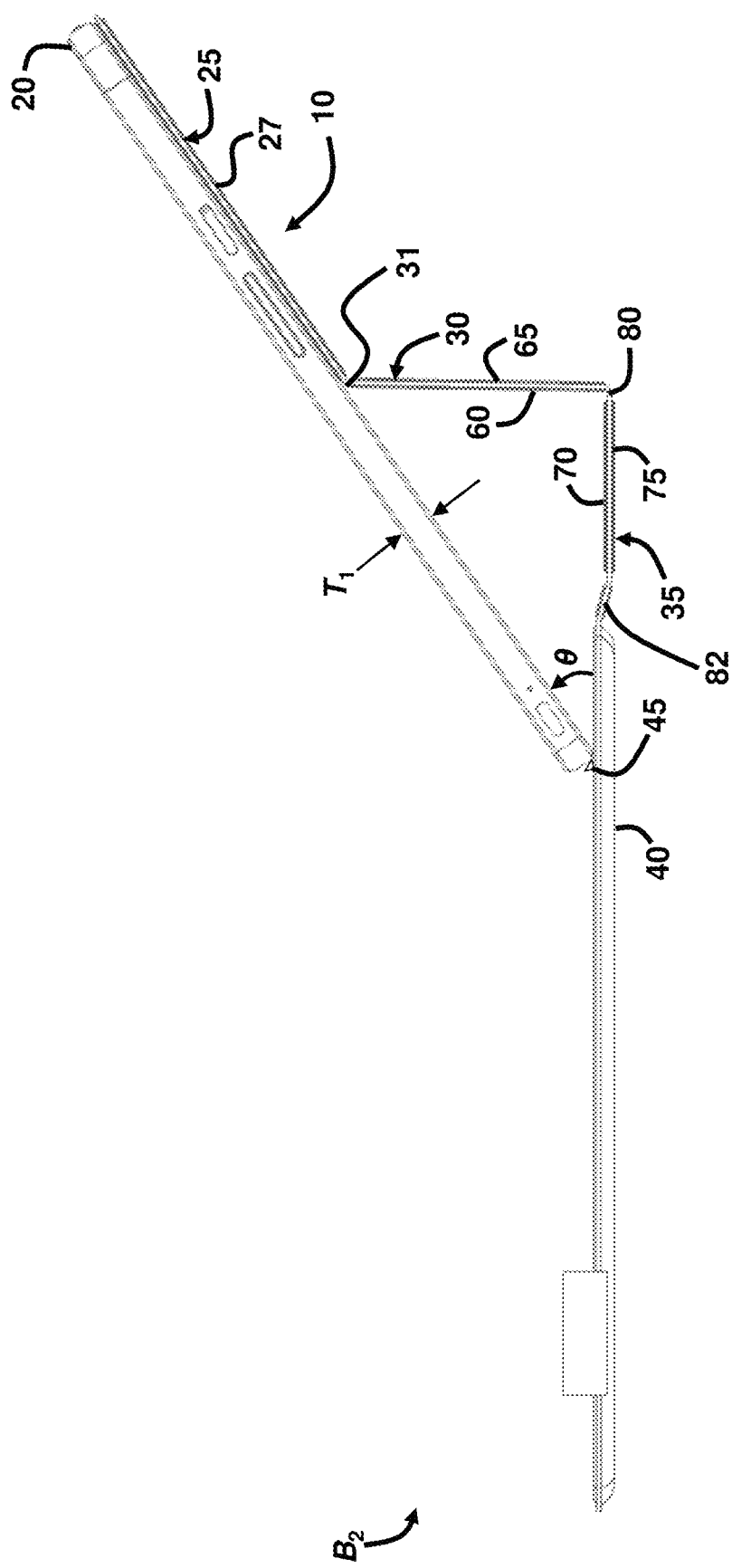
FIG. 2 is a schematic diagram illustrating a side view of the electronic device cover of FIG. 1 in another aspect of the second configuration, according to an example.

FIG. 2, with reference to FIG. 1, is a schematic diagram illustrating a side view of the electronic device cover 10 in another example of a second configuration $B_2$. Any of the second section 30 and the third section 35 are set to be spaced apart from the electronic device 20 in the second configuration $B_2$. Accordingly, in the example of FIG. 2, the second section 30 does not contact the electronic device 20 except for at the pivot region 31 where the first section 25 connects to the second section 30. The difference between the second configuration $B_2$ shown in FIG. 2 compared with the second configuration $B_1$ shown in FIG. 1 is the angle θ of the electronic device 20 relative to the fourth section 40 of the body component 15. The ability of the second section 30 to bend relative to the first section 25 allows the electronic device 20 to have a smaller angle θ relative to the fourth section 40 in the second configuration $B_2$ compared with the corresponding position of the electronic device 20 and the fourth section 40 shown in the second configuration $B_1$. Because the data port 45 is rotatable, the electronic device 20 is able to maintain connection with the data port 45 even at the smaller angle θ. In FIG. 2, the second section 30 is shown to be bent at approximately a 90° angle compared to the third section 35. The second section 30 is also shown to be bent less than 90° with respect to the electronic device 20, in FIG. 2. In the second configuration $B_2$, the approximately 90° angle of the second section 30 relative to the third section 35 results in the second section 30 to provide structural support for the electronic device 20. Comparatively, in the second configuration $B_1$ shown in FIG. 1, the bending of the third section 35 relative to the fourth section 40 results in the third section 35 to provide structural support for the electronic device 20. In FIG. 2, the third section 35 and the fourth section 40 are substantially aligned and generally planar with respect to one another. As indicated in FIG. 2, the electronic device 20 may comprise a thickness $T_1$.

Figure 3:
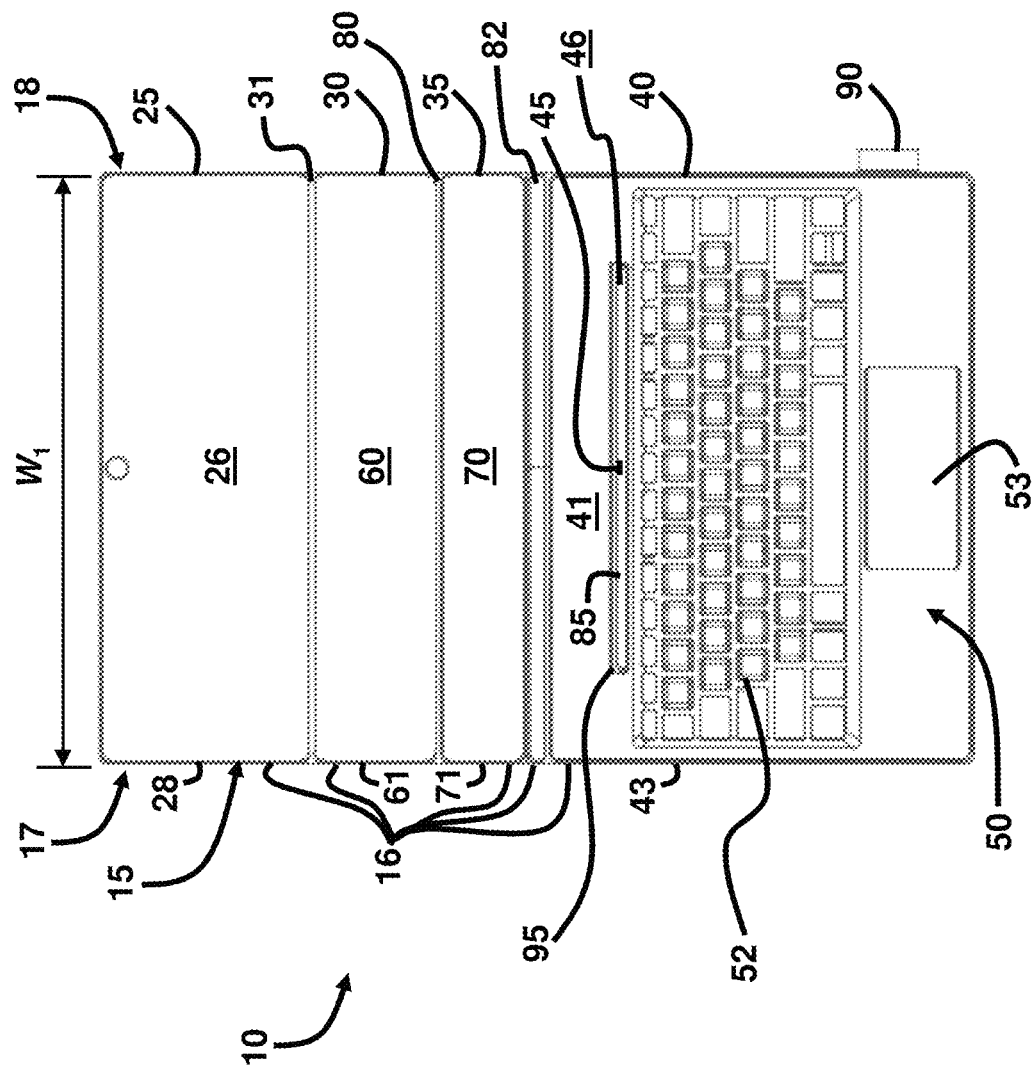
FIG. 3 is a schematic diagram illustrating a front view of an electronic device cover in an open and flat configuration, according to an example.
Figure 4:
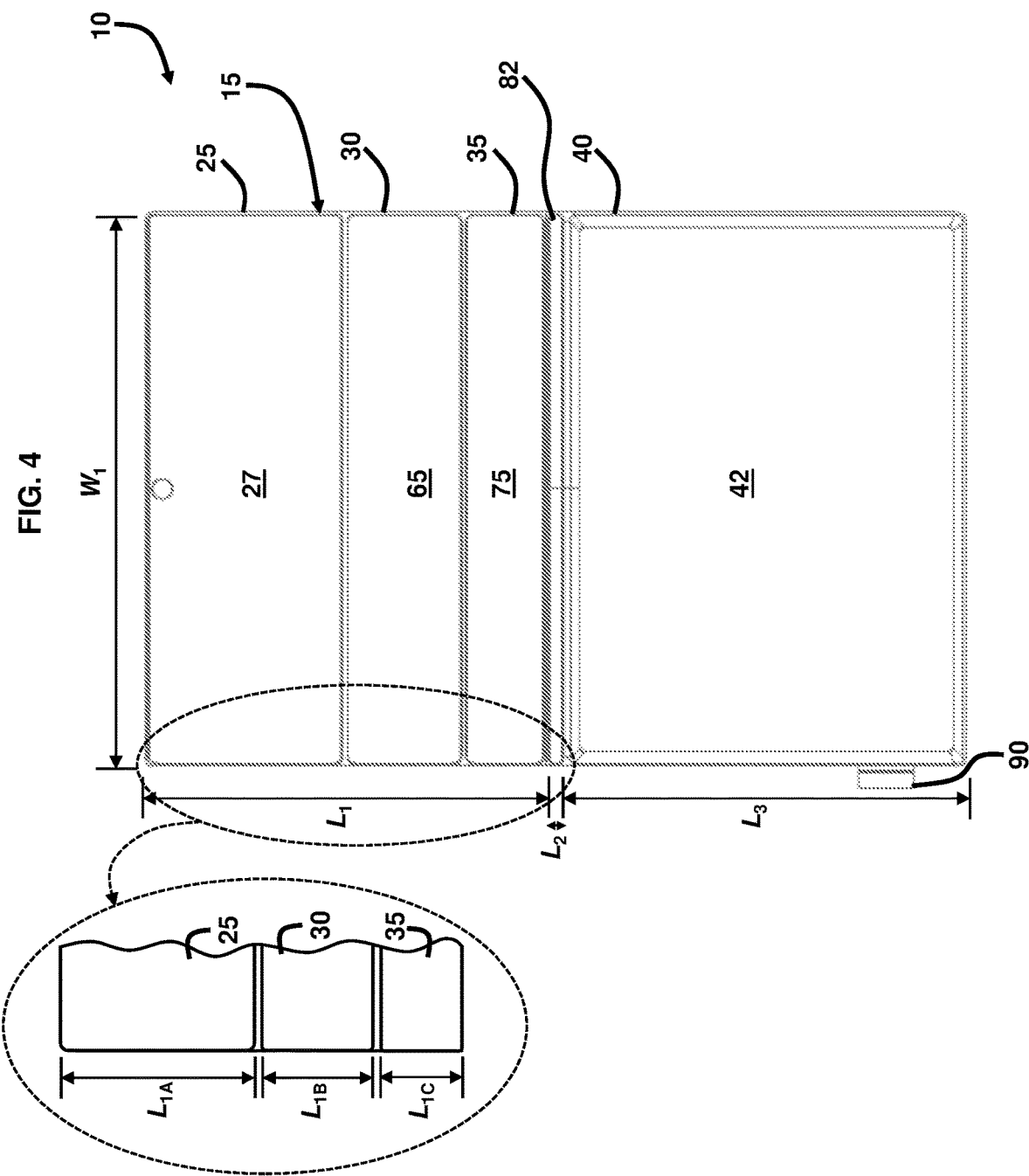
FIG. 4 is a schematic diagram illustrating a rear view of an electronic device cover in an open and flat configuration, according to an example.

As shown in FIGS. 2 through 4, the first section 25 comprises an inner portion surface 26 and an outer portion surface 27. The second section 30 comprises a first inner portion surface 60 and a first outer portion surface 65. The third section 35 comprises a second inner portion surface 70 and a second outer portion surface 75. The fourth section 40 comprises an inner surface 41 and an outer surface 42. The various surfaces 26, 27, 60, 65, 70, 75, and 41 may be considered the covering of the body component 15, and may be either a soft, hard, rigid, flexible, or hybrid material. The first inner portion surface 60 may be substantially transverse to the second inner portion surface 70 when the body component 15 is in the second configuration $B_2$. The electronic device cover 10 may comprise a pivot region 80 to connect the second section 30 to the third section 35. The pivot region 80 is to allow the second section 30 to bend with respect to the third section 35. The electronic device cover 10 may comprise another pivot region 82 to connect the third section 35 to the fourth section 40. In an example, the pivot regions 80, 82 may be hinges or other types of connection mechanisms to provide rotatable motion of the two connected components with respect to one another. In another example, the pivot region 80 may be a break in the structural attachment between the second section 30 and the third section 35 with a sealing/joining of the second section 30 to the third section 35 creating a pivot region 80. Likewise, the pivot region 31, where the first section 25 connects to the second section 30, may be a hinge or other type of connection mechanism to provide rotatable motion of the two connected components with respect to one another. In another example, the pivot region 31 may be a break in the structural attachment between the first section 25 and the second section 30 with a sealing/joining of the first section 25 to the second section 30 creating a pivot region 31. According to various examples, the pivot region 82 may be part of the third section 35 or the fourth section 40 or may be its own separate component/section that connects with, and is rotatable with respect to, the third and fourth sections 35, 40.

FIG. 3, with reference to FIGS. 1 and 2, is a schematic diagram illustrating a front view of the electronic device cover 10 in an open and flat configuration, according to an example. In this example, the electronic device cover 10 is shown in a completely open configuration to permit attachment of the electronic device 20, not shown in FIG. 3, to the first section 25 of the body component 15. Moreover, the input device 50 is shown to comprise a keyboard 52, according to the example provided in FIG. 3. Other types of input devices 50 are also possible such as a touch pad 53. In the example of the electronic device cover 10 in FIG. 3, the first section 25 is to attach to an electronic device 20, not shown in FIG. 3, and the second section 30 is integrated with the first section 25. The second section 30 is to bend with respect to the first section 25 about pivot region 31, which extends the entire width $W_1$ of the first section 25 and the second section 30. The third section 35 is operatively connected to the second section 30, and the pivot region 80 is between the second section 30 and the third section 35 such that the pivot region 80 extends the entire width entire width $W_1$ of the second section 30 and third section 35. In the open and flat configuration of FIG. 3, the edge 28 of the first section 25, the edge 61 of the second section 30, the edge 71 of the third section 35, and the edge 43 of the fourth section 40 may be aligned to provide a planar edge surface 16 for the body component 15 on both lateral sides 17, 18 of the electronic device cover 10. This planar edge surface 16 allows the body component 15 to confine the electronic device 20 within the perimeter boundary 55; e.g., boundary edge, of the fourth section 40 when the first section 25, second section 30, and third section 35 are sandwiching the electronic device 20 with respect to the fourth section 40. In other words, the first configuration A and the third configuration C are set to confine the position of the electronic device 20 within the perimeter boundary 55; e.g., boundary edge, of the fourth section 40. A holder 90 may be attached to the fourth section 40 to provide a chamber to hold a stylus, not shown. In an example, the keyboard 52 is integrated with the fourth section 40 and is communicatively linked to the data port 45 such that when a user engages the keyboard 52 and/or touch pad 53, electrical signals are transmitted through the data port 45 and to the electronic device 20 connected to the data port 45. The keyboard 52 is to face away from the electronic device 20 in the first configuration A. The keyboard 52 is to be held against and face the electronic device 20 in the third configuration C. The third section 35 is to be unattached from the electronic device 20 to permit the electronic device 20 to move away from the second section 30 and closer to the keyboard 52.

The pivot region 80 is to allow the second section 30 to rotate with respect to the third section 35 and to allow the electronic device 20 to articulate in the first configuration A, the second configuration $B_1$ or $B_2$, and a third configuration C, among other configurations, while attached to the first section 25, as described above with respect to FIGS. 1 and 2. The fourth section 40 is shown to be integrated with the third section 35. The pivot region 82 is shown, in FIG. 3, to extend the entire width of the third section 35 and the fourth section 40. In the open and flat configuration of FIG. 3, the surfaces 26, 60, and 70 of the first, second, and third sections 25, 30, 35, respectively, are planar with respect to one another. A rotating bar 85 is operatively connected to the fourth section 40. The rotating bar 85 comprises the data port 45 in the example shown in FIG. 3.

In an example, the rotating bar 85 is an elongated member that is integrated with the fourth section 40 and is recessed in the fourth section 40. The rotating bar 85 may comprise an upper surface 46 that is substantially planar to the inner surface 41 of the fourth section 40 when the rotating bar 85 is in its non-rotated configuration. The rotating bar 85 is to rotate and allow the data port 45 to connect to the electronic device 20, according to an example. As such, if the positioning of the electronic device 20 changes, then the rotating bar 85 permits the data port 45 to connect to the electronic device 20, and stay connected thereto until a user removes the electronic device 20 from the data port 45; e.g., for transitioning from the second configuration $B_1$ or $B_2$ to either the first configuration A or the third configuration C. For example, the electronic device 20 may go from the second configuration $B_1$ of FIG. 1 to the second configuration $B_2$ of FIG. 2, and the rotating bar 85 is able to rotate at the appropriate respective angle to retain connection of the data port 45 with the electronic device 20. As such, the rotating bar 85 may automatically rotate outwards from the fourth section 40. The rotating bar 85 may be set in a recessed portion 95 of the fourth section 40. When the rotating bar 85 is in a non-rotated state and is fully seated in the recessed portion 95, the upper surface 46 that is substantially planar to the inner surface 41 of the fourth section 40. In one example, the rotating bar 85 automatically rotates out of the recessed portion 95 when the electronic device 20 is connected to the data port 45. In another example, the rotating bar 85 may be touched, pushed, or pulled to trigger the rotation outwards from the recessed portion 95.

FIG. 4, with reference to FIGS. 1 through 3, is a schematic diagram illustrating a rear view of the electronic device cover 10 in an open and flat configuration, according to an example. In the open and flat configuration of FIG. 4, the surfaces 27, 65, 75, and 42 of the first, second, third, and fourth sections 25, 30, 35, 40, respectively, are planar with respect to one another. Furthermore, in an example, the combined length $L_1$ of the first section 25, second section 30, and third section 35 substantially equals the length $L_3$ of the fourth section 40. In an example, the length $L_2$ of the pivot region 82 is provided to be larger than the thickness $T_1$ of the electronic device 20, which allows the first configuration A and the third configuration C to completely confine the position of the electronic device 20 within the perimeter boundary 55; e.g., boundary edge, of the fourth section 40, without having portions of the electronic device 20 overhanging the perimeter boundary 55; e.g., boundary edge, of the fourth section 40 of the body component 15. As further shown in FIG. 4, an enlarged, partial, and detailed view of the encircled dotted area is depicted illustrating the respective sub-lengths $L_{1A}$, $L_{1B}$, $L_{1C}$ of the first section or panel 25, second section or panel 30, and third section or panel 35, and namely that the first section 25 comprises a first sub-length $L_{1A}$, the second section 30 comprises a second sub-length $L_{1B}$ that is less than the first sub-length $L_{1A}$, and the third section 35 comprises a third sub-length $L_{1C}$ that is less than the second sub-length $L_{1B}$.

Figure 5:
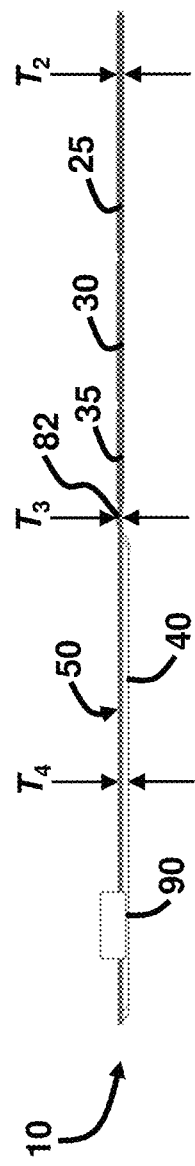
FIG. 5 is a schematic diagram illustrating a side view of an electronic device cover in an open and flat configuration, according to an example.

FIG. 5, with reference to FIGS. 1 through 4, is a schematic diagram illustrating a side view of the electronic device cover 10 in an open and flat configuration, according to an example. Surface 26 of the first section 25, surface 60 of the second section 30, and surface 70 of the third section 35 may be planar with respect to one another in the open and flat configuration. Moreover, surface 27 of the first section 25, surface 65 of the second section 30, and surface 75 of the third section 35 may be planar with respect to one another in the open and flat configuration. Additionally, in an example, the first section 25, second section 30, and third section 35 may comprise a uniform thickness $T_2$. The pivot region 82 may comprise a thickness $T_3$ that is less than thickness $T_2$. The fourth section 40 may comprise a thickness $T_4$ that is greater than thickness $T_2$ and thickness $T_3$. According to an example, the respective thicknesses $T_2$, $T_3$, and $T_4$ may permit the first configuration A and the third configuration C to completely confine the position of the electronic device 20 within the perimeter boundary 55; e.g., boundary edge, of the fourth section 40, without having portions of the electronic device 20 overhanging the perimeter boundary 55; e.g., boundary edge, of the fourth section 40 of the body component 15.

Figure 6:
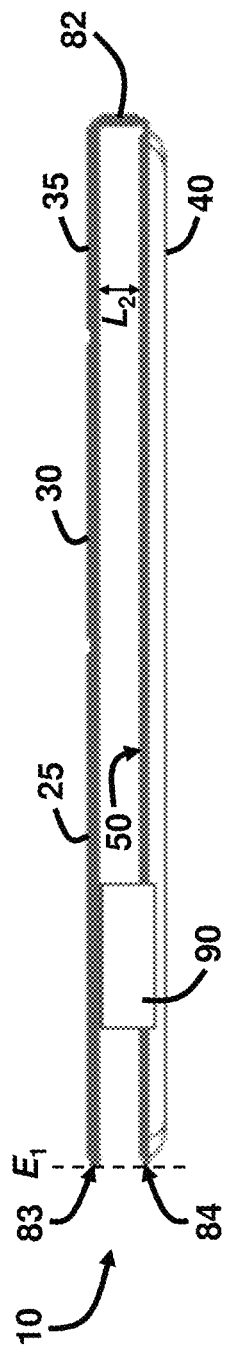
FIG. 6 is a schematic diagram illustrating a side view of an electronic device cover in a closed and folded configuration, according to an example.

FIG. 6, with reference to FIGS. 1 through 5, is a schematic diagram illustrating a side view of the electronic device cover 10 in a closed and folded configuration, according to an example. In the closed and folded configuration, which refers to the third configuration C, the first section 25, the second section 30, and the third section 35 are aligned and substantially planar to one another. The fourth section 40 is substantially parallel to the first, second, and third sections 25, 30, 35. In an example, the pivot region 82 is positioned to be substantially transverse to the first, second, third, and fourth sections 25, 30, 35, 40. The length $L_2$ of the pivot region 82 defines the distance between the fourth section 40 and the first, second, and third sections 25, 30, 35 such that the length $L_2$ is sufficient to accommodate the thickness $T_1$ of the electronic device 20. As indicated in FIG. 6, the distal end 83 of the first section 25 and the distal end 84 of the fourth section 40 are substantially aligned to form a planar edge $E_1$ in the closed and folded configuration, which confines the position of the electronic device 20 within the perimeter boundary 55; e.g., boundary edge, of the fourth section 40, without having portions of the electronic device 20 overhanging the perimeter boundary 55; e.g., boundary edge, of the fourth section 40, as well as not extending past the distal end 83 of the first section 25.

Figure 7:
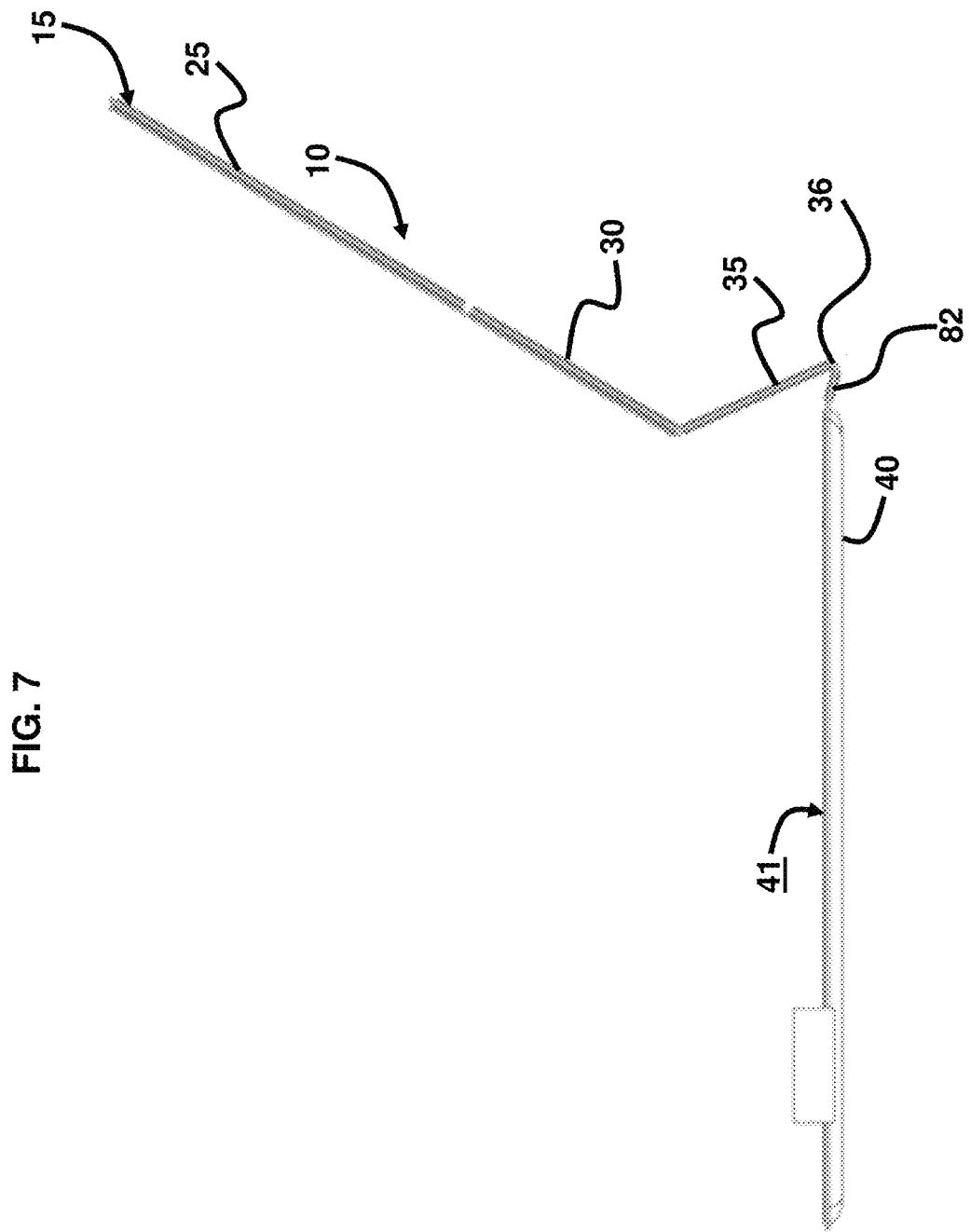
FIG. 7 is a schematic diagram illustrating a side view of an electronic device cover in an open and bent configuration, according to an example.

FIG. 7, with reference to FIGS. 1 through 6, is a schematic diagram illustrating a side view of the electronic device cover 10 in an open and bent configuration, according to an example. In the example configuration shown in FIG. 7, the first section 25 and the second section 30 are aligned in a substantially planar arrangement with the third section 35 bent with respect to the second section 30. The pivot region 82 is also bent with respect to the third section 35 creating a support edge 36. In this configuration, the support edge 36 in conjunction with the third section 35 and pivot region 82 provide support and stability to the electronic device 20 upon the electronic device 20 being attached to the first section 25 and second section 30. The open and bent configuration of the electronic device cover 10 illustrated in FIG. 7 is similar to the second configuration $B_1$ to permit the electronic device 20 to be utilized in a laptop-mode configuration. In the view of FIG. 7, the fourth section 40 is shown to have a planar inner surface 41 since the rotating bar 85 and attached data port 45 are not in a state of rotation.

Figure 8A:
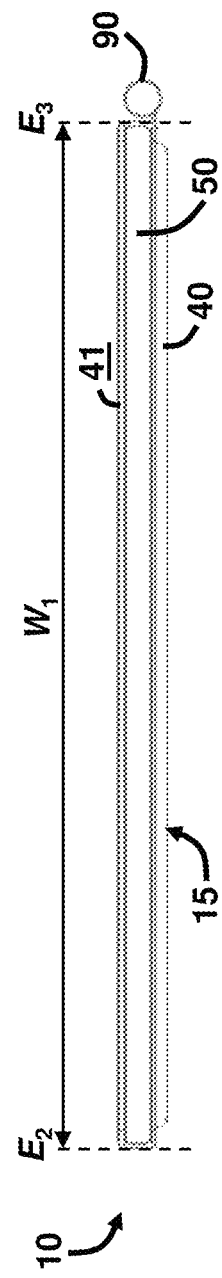
FIG. 8A is a schematic diagram illustrating a bottom view of an electronic device cover in an open and flat configuration, according to an example.
Figure 8B:
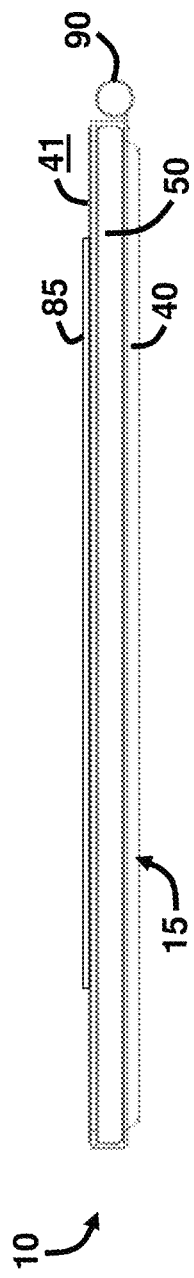
FIG. 8B is a schematic diagram illustrating a bottom view of an electronic device cover in an open and flat configuration with an elongated member extending out of the electronic device cover, according to an example.

FIG. 8A, with reference to FIGS. 1 through 7, is a schematic diagram illustrating a bottom view of the electronic device cover 10 in an open and flat configuration, according to an example. In the view of FIG. 8A, the inner surface 41 of the fourth section 40 is substantially planar. The lateral planar edges $E_2$, $E_3$ of the body component 15 are provided to confine the position of the electronic device 20 within the perimeter boundary 55; e.g., boundary edge, of the fourth section 40, without having portions of the electronic device 20 overhanging the perimeter boundary 55; e.g., boundary edge, of the fourth section 40. For the purposes of the description herein, the holder 90 is not considered to be within the edge $E_3$ of the body component 15. The lateral planar edges $E_2$, $E_3$ of the body component 15 define the width $W_1$ of the electronic device cover 10. FIG. 8B, with reference to FIGS. 1 through 8A, is a schematic diagram illustrating a bottom view of the electronic device cover 10 in an open and flat configuration with the rotating bar 85; e.g., an elongated member, in a rotated state and extending out of the electronic device cover 10, according to an example. When rotated outwards, the rotating bar 85 extends above the inner surface 41 of the fourth section 40.

Figure 9B:
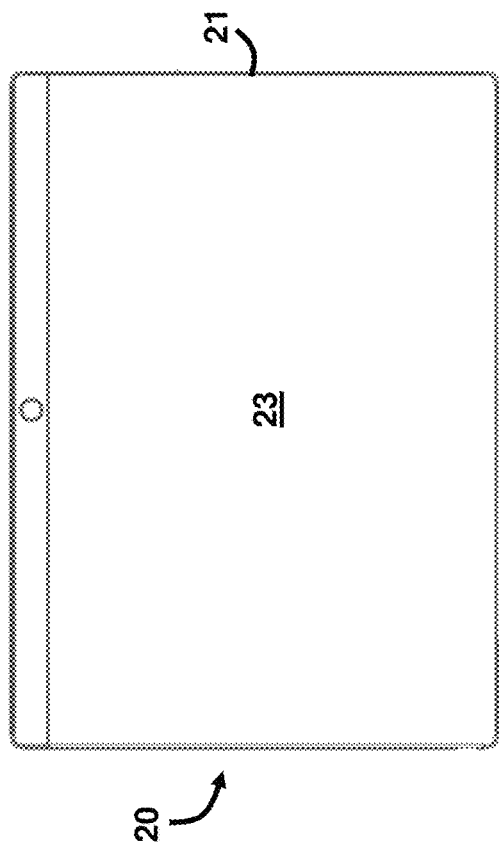
FIG. 9B is a schematic diagram illustrating a rear view of an electronic device, according to an example.
Figure 9A:
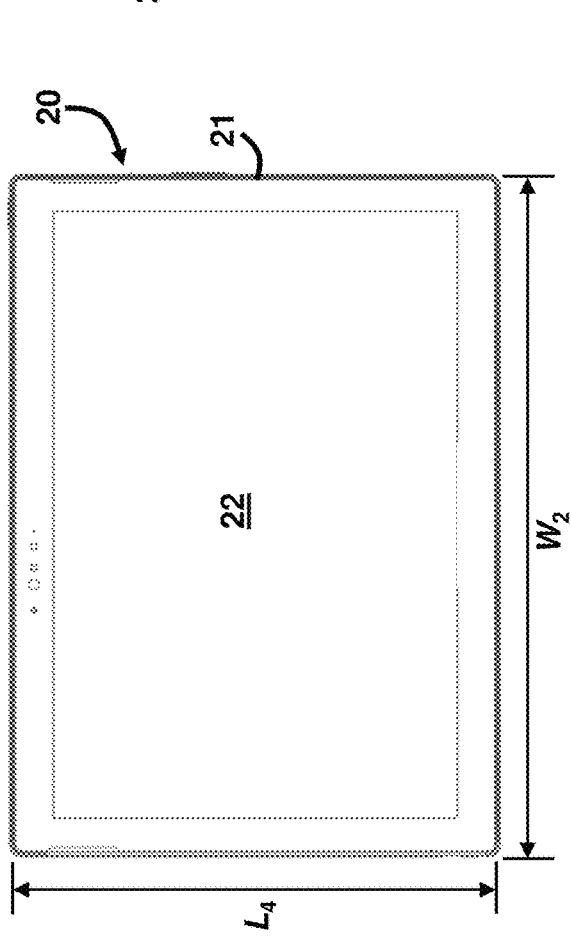
FIG. 9A is a schematic diagram illustrating a front view of an electronic device, according to an example.
Figure 9C:
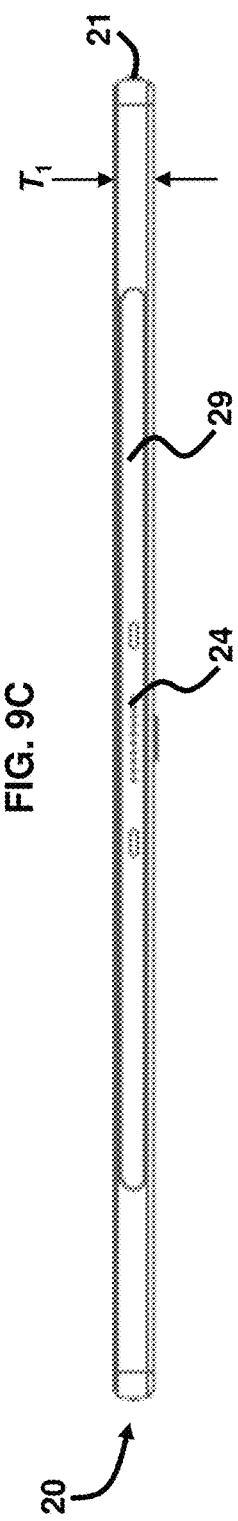
FIG. 9C is a schematic diagram illustrating a bottom view of an electronic device, according to an example.

FIGS. 9A, 9B, and 9C with reference to FIGS. 1 through 8B, are schematic diagrams illustrating the front, rear, and bottom views, respectively, of the electronic device 20, according to an example. According to examples, as described above, the electronic device 20 may be a tablet computer, a mini-tablet computer, a smartphone, or other similar device. The electronic device 20 comprises a body 21, a screen surface 22, and a rear surface 23. The body 21 comprises a data port interface 24 positioned on or in the bottom side 29 of the body 21. The data port interface 24 is provided to connect with the data port 45 of the fourth section 40 of the electronic device cover 10 to permit the exchange of electrical signals between the input device 50 to the electronic device 20. The inner portion surface 26 of the first section is provided to attach to the rear surface 23 of the electronic device 20. In the first configuration A and the second configuration $B_2$, the inner portion surface 26 of the first section 25 is the only section among the first section 25, second section 30, and third section 35 to contact the rear surface 23 of the electronic device 20. In the second configuration $B_1$, the inner portion surface 26 of the first section 25 and the first inner portion surface 60 are the only sections among the first section 25, second section 30, and third section 35 to contact the rear surface 23 of the electronic device 20. In the third configuration C, the inner portion surface 26 of the first section 25, the first inner portion surface 60, and the second inner portion surface 70 of the third section 35 all contact the rear surface 23 of the electronic device 20. Moreover, in the third configuration C, the inner surface 41 of the fourth section 40 faces and is held against and may contact the screen surface 22 of the electronic device 20. In an example, the body 21 of the electronic device 20 has a length $L_4$, a width $W_2$, and a thickness $T_1$, which are provided to be confined within the perimeter boundary 55; e.g., boundary edge, of the fourth section 40 of the body component 15, without having portions of the electronic device 20 overhanging the perimeter boundary 55; e.g., boundary edge, of the fourth section 40, when the electronic device 20 is attached to the body component 15 of the electronic device cover 10.

Figure 10:
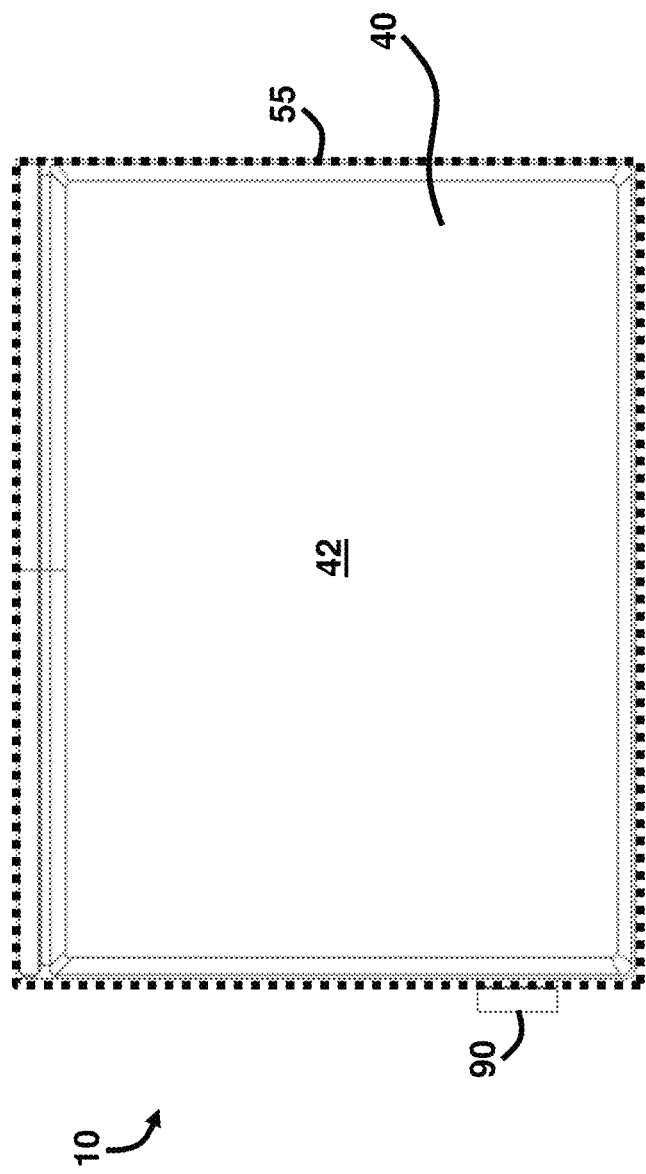
FIG. 10 is a schematic diagram illustrating a rear view of a fourth section of an electronic device cover, according to an example.

FIG. 10, with reference to FIGS. 1 through 9C, is a schematic diagram illustrating a rear view of the fourth section 40 of the electronic device cover 10, according to an example. In the view of FIG. 10, the outer surface 42 of the fourth section 40 is shown to have a planar perimeter boundary 55; e.g., boundary edge denoted by the dotted line, and not including the holder 90. Accordingly, in this view, no portion of the electronic device 20 is visible since the entire body 21 of the electronic device 20 is confined within the perimeter boundary 55; e.g., boundary edge of the fourth section 40, not including the holder 90, and in the view of FIG. 10 the electronic device 20 would be on the opposite side of electronic device cover 10.

The examples of the electronic device cover 10 described herein permit an electronic device 20 to be protected by the electronic device cover 10, and retain the entire electronic device 20 within the perimeter boundary 55; e.g., boundary edge of the fourth section 40 of the electronic device cover 10. The body component 15 of the electronic device cover 10 facilitates various configurations A, $B_1$, $B_2$, C, among other configurations to permit the electronic device 20 to be used in a tablet mode or a laptop mode. The second section 30, third section 35, pivot region 82, and support edge 36 all provide support and stability for the electronic device 20 alone or in various combinations with one another depending on the particular configuration of the electronic device cover 10. Moreover, the first section 25 and fourth section 40 may also provide support and stability for the electronic device 20, alone or in various combinations with other parts, sections, edges, and/or regions of the electronic device cover 10, depending on the particular configuration of the electronic device cover 10. The various sections 25, 30, 35, 40, as well as pivot regions 80, 82, and support edge 36 along with the rotating bar 85 with the connected data port 45 permit the electronic device 20 to be moved in various configurations and angles to allow a user to have an enhanced viewing and interaction experience with the electronic device 20 according to the user's preferences.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. An electronic device cover comprising:
a body component to attach to an electronic device, the body component to articulate among a first configuration, a second configuration, and a third configuration, and the body component comprising:
a first section to attach to the electronic device, wherein the first section comprises a first sub-length;
a second section operatively connected to the first section, the second section to bend with respect to the first section, wherein the second section comprises a second sub-length that is less than the first sub-length;
a third section operatively connected to the second section, the third section to bend with respect to the second section, and any of the second section and the third section to provide structural support to the electronic device in the second configuration, wherein the third section comprises a third sub-length that is less than the second sub-length;
a fourth section operatively connected to the third section and comprising a rotatable data port; and
a rotating bar operatively connected to the fourth section, wherein the rotating bar comprises a data port, wherein the rotating bar is recessed in the fourth section, wherein the rotating bar is set in a recessed portion of a planar surface of the fourth section when the rotating bar is in a non-rotated configuration, wherein the rotating bar is to rotate with respect to an articulation of the body component in the first configuration, the second figuration, and the third configuration and allow the data port to connect to the electronic device, and wherein the rotating bar rotates outward from the fourth section when the rotating bar is in a rotated configuration;
an input device operatively connected to the fourth section and operatively connected to the rotatable data port, wherein the input device is to be held against and face the electronic device in the third configuration,
wherein the body component is to constrain the electronic device within a perimeter boundary of the fourth section in the first configuration and the third configuration.

2. The electronic device cover of claim 1, wherein the second section and the third section are to articulate between a flat configuration and a bent configuration, wherein the flat configuration corresponds to any of the first configuration and the third configuration of the body component, and wherein the bent configuration corresponds to the second configuration of the body component.

3. The electronic device cover of claim 1, wherein the second section comprises a first inner portion surface and a first outer portion surface, and wherein the third section comprises a second inner portion surface and a second outer portion surface.

4. The electronic device cover of claim 3, wherein the first inner portion surface is substantially transverse to the second inner portion surface when the body component is in the second configuration.

5. The electronic device cover of claim 1, comprising:
a first pivot region to connect the second section to the third section, wherein the first pivot region is to allow the second section to bend with respect to the third section; and
a second pivot region to connect the third section to the fourth section.

6. The electronic device cover of claim 1, wherein the input device comprises a keyboard.

7. The electronic device cover of claim 1, wherein the first sub-length is substantially the same as the second sub-length combined with the third sub-length.

8. The electronic device cover of claim 1, comprising a cylindrically shaped holder attached to a side of the fourth section and outside the perimeter boundary of the fourth section, wherein the cylindrically shaped holder is configured to accommodate a stylus.

9. An electronic device cover comprising:
a first section to attach to an electronic device, wherein the first section comprises a first sub-length;
a second section integrated with the first section, the second section to bend with respect to the first section, wherein the second section comprises a second sub-length that is less than the first sub-length;
a third section operatively connected to the second section, wherein the third section comprises a third sub-length that is less than the second sub-length;
a pivot region between the second section and the third section, wherein the pivot region is to allow the second section to rotate with respect to the third section and to allow the electronic device to articulate in a first configuration, a second configuration, and a third configuration while attached to the first section;
a fourth section integrated with the third section;
a rotating bar operatively connected to the fourth section, wherein the rotating bar comprises a data port, wherein the rotating bar is recessed in a planar surface of the fourth section, wherein the rotating bar is set in a recessed portion of the fourth section when the rotating bar is in a non-rotated configuration, wherein the rotating bar is to rotate with respect to an articulation of the body component in the first configuration, the second figuration, and the third configuration and allow the data port to connect to the electronic device, and wherein the rotating bar rotates outward from the fourth section when the rotating bar is in a rotated configuration; and
a keyboard integrated with the fourth section and communicatively linked to the data port,
wherein the first configuration and the third configuration are set to confine a position of the electronic device within a boundary edge of the fourth section.

10. The electronic device cover of claim 9, wherein the keyboard is to face away from the electronic device in the first configuration, and wherein the keyboard is to be held against and face the electronic device in the third configuration.

11. The electronic device cover of claim 9, wherein the third section is to be unattached from the electronic device to permit the electronic device to move away from the second section and closer to the keyboard.

12. The electronic device cover of claim 9, wherein the data port is to connect to the electronic device.

13. The electronic device cover of claim 9, wherein the first sub-length is substantially the same as the second sub-length combined with the third sub-length.

14. The electronic device cover of claim 9, comprising a cylindrically shaped holder attached to a side of the fourth section and outside a boundary edge of the fourth section, wherein the cylindrically shaped holder is configured to accommodate a stylus.

15. An electronic device cover comprising:
a first panel to attach to an electronic device, wherein the first panel comprises a first sub-length;
a second panel operatively connected to the first panel, the second panel to rotate with respect to the first panel, wherein the second panel comprises a second sub-length that is less than the first sub-length;
a third panel rotatably connected to the second panel to allow the electronic device to articulate between a first configuration, a second configuration, and a third configuration, wherein the second panel and the third panel are to provide structural stability to the electronic device in the second configuration, wherein the third panel comprises a third sub-length that is less than the second sub-length;
a fourth panel rotatably connected to the third panel and comprising a recessed portion;
an elongated member positioned in the recessed portion, the elongated member comprising a data port to connect to the electronic device, wherein the elongated member is set in the recessed portion of a planar surface of the fourth section when the elongated member is in a non-rotated configuration, wherein the elongated member is to rotate with respect to an articulation of the electronic device in the first configuration, the second figuration, and the third configuration and allow the data port to connect to the electronic device, and wherein the elongated member rotates outward from the fourth section when the elongated member is in a rotated configuration; and
a keyboard integrated with the fourth panel and communicatively linked to the data port.

16. The electronic device cover of claim 15, wherein the elongated member is to rotate out of the recessed portion.

17. The electronic device cover of claim 15, wherein the first configuration and the third configuration are set to completely confine a position of the electronic device within a boundary edge of the fourth panel.

18. The electronic device cover of claim 15, wherein the keyboard is to directly face away from the electronic device in the first configuration, and wherein the keyboard is to directly face the electronic device in the third configuration.

19. The electronic device cover of claim 15, wherein the first sub-length is substantially the same as the second sub-length combined with the third sub-length.

20. The electronic device cover of claim 15, comprising a cylindrically shaped holder attached to a side of the fourth section and outside a perimeter boundary of the fourth panel, wherein the cylindrically shaped holder is configured to accommodate a stylus.

* * * * *